(12) United States Patent
Ichimura et al.

(10) Patent No.: US 7,791,052 B2
(45) Date of Patent: Sep. 7, 2010

(54) SINGLE-PHOTON GENERATION APPARATUS AND QUANTUM BIT READING APPARATUS AND METHOD

(75) Inventors: Kouichi Ichimura, Yokohama (JP); Hayato Goto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 184 days.

(21) Appl. No.: 12/211,962

(22) Filed: Sep. 17, 2008

(65) Prior Publication Data
US 2009/0084991 A1 Apr. 2, 2009

(30) Foreign Application Priority Data
Sep. 27, 2007 (JP) ............... 2007-250457

(51) Int. Cl.
*G21G 4/00* (2006.01)
(52) U.S. Cl. ............... 250/493.1; 250/214 R; 250/207; 250/214 VT; 250/225; 359/107; 359/108; 257/9; 257/14; 324/300; 324/304; 324/305; 324/312; 372/2; 372/23; 372/44.011; 372/69
(58) Field of Classification Search ............... 250/493.1, 250/214 R, 207, 214 VT, 225; 359/107, 108; 257/9, 14; 324/300, 304, 305, 312; 372/2, 372/23, 44.011, 69
See application file for complete search history.

(56) References Cited
U.S. PATENT DOCUMENTS
6,800,837 B1 * 10/2004 Ichimura et al. ........ 250/214 R
7,466,725 B2 * 12/2008 Ichimura et al. ............... 372/2
2006/0043357 A1 3/2006 Ichimura et al.

FOREIGN PATENT DOCUMENTS
JP 3682266 5/2005

OTHER PUBLICATIONS
Alexandre Blais, et al., "Single microwave photon source using circuit QED", Bulletin of the American Physical Society March Meeting (vol. 52, No. 1), H33.00005, 2007, 1 page.

\* cited by examiner

*Primary Examiner*—Jack I Berman
*Assistant Examiner*—Meenakshi S Sahu
(74) *Attorney, Agent, or Firm*—Oblon, Spivak, McClelland, Maier & Neustadt, L.L.P.

(57) ABSTRACT

A method of generating a single photon, includes preparing an optical resonator including a resonator mode of a resonance angular frequency $\omega_c$, preparing a material contained in the optical resonator, including a low energy state $|g\rangle$ and a high energy state $|e\rangle$, and including a transition angular frequency $\omega_a$ between $|g\rangle$–$|e\rangle$ that is varied by an external field, applying, to the material, light of an angular frequency $\omega_l$ different from the resonance angular frequency $\omega_c$, and applying a first external field to the material to vary the transition angular frequency $\omega_a$ to resonate with the angular frequency $\omega_l$, such that a state of the material is changed to $|e\rangle$, and then applying a second external field to the material to vary the transition angular frequency $\omega_a$ to resonate with the resonance angular frequency $\omega_c$, such that the state of the material is restored to $|g\rangle$.

16 Claims, 8 Drawing Sheets

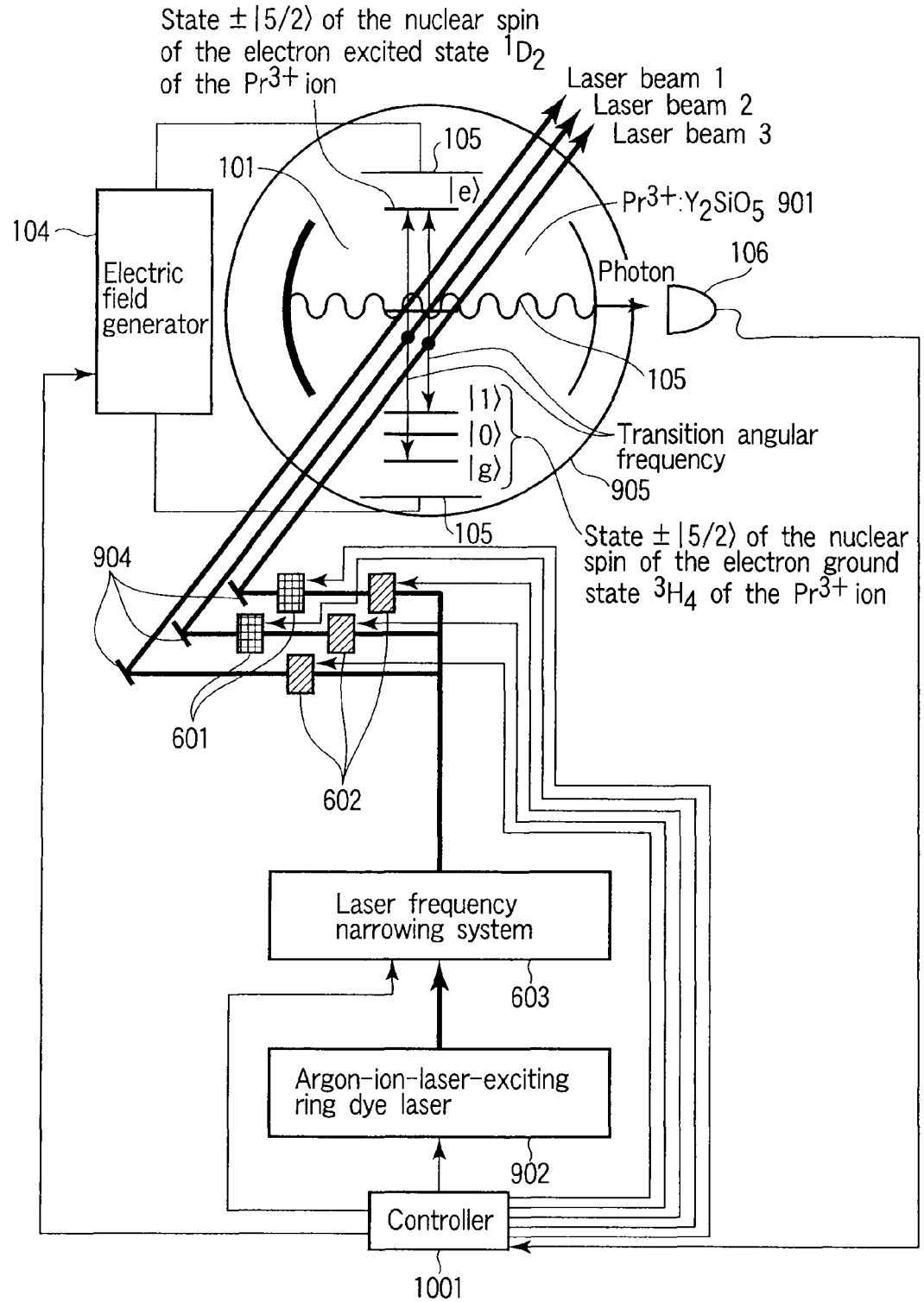
F I G. 10

SINGLE-PHOTON GENERATION APPARATUS AND QUANTUM BIT READING APPARATUS AND METHOD

CROSS-REFERENCE TO RELATED APPLICATIONS

This application is based upon and claims the benefit of priority from prior Japanese Patent Application No. 2007-250457, filed Sep. 27, 2007, the entire contents of which are incorporated herein by reference.

BACKGROUND OF THE INVENTION

1. Field of the Invention

The present invention relates to an easy-to-use single-photon generation apparatus for generating a single photon, and a quantum bit reading apparatus and method.

2. Description of the Related Art

A single-photon source is an important apparatus for quantum information processing techniques, such as quantum computers utilizing a photon, or quantum encryption techniques, and is required to eject a single photon at desired timing in a particular spatial mode.

There is a method for most simply and reliably satisfying the requirement, in which in principle, a π-pulse (π: circular constant) laser is used to excite a two-state system, such as a single atom, ion, molecule or quantum dot, and a photon of a frequency corresponding to a resonator mode is ejected in the resonator mode as a result of the coupling of the two-state system and the resonator mode (with coupling constant g), and is further ejected at a dissipation constant κ (>g) in a particular spatial mode set outside the resonator. In this method, a period of $\pi/\Omega$ is necessary for excitation, and a period of $\pi/g$ is necessary for photon ejection. Immediately after photon ejection, the two-state system is restored to its initial state, and next photon ejection cycle can be started. Since $\Omega=2\pi E\cdot\mu/h$ (E: Laser electric field; μ: Transition dipole moment), if a strong laser beam is used, the cycle (interval) of generation of a single photon, i.e., $\pi/\Omega+\pi/g$, becomes $\pi/g$, which is the highest operation speed for a single-photon source utilizing a resonator mode. In this method, however, the angular frequency (wavelength) of strongly excited light is equal to an angular frequency (wavelength) corresponding to the resonator mode, and the light becomes stray light (noise) and is liable to mix with a single photon to be used.

To avoid this problem, it is considered to use a single three-state system, in which a transition corresponding to excitation is made different from a transition corresponding to photon ejection by the coupling of the system with the resonator mode. Further, there is another method using adiabatic passage without using excitation to an upper state, although it employs a three-state system of a single physical system.

However, in these methods, at least a period of approx. 1/g is required until a photon is generated after the initial state (e.g., |1>), and immediately after generation of the photon, the state is not restored to the initial state (for example, it is kept at |2>). Therefore, it is necessary to wait until the initial state (|1>) is restored by a spontaneous transition between |2>–|1> that is generally longer than the other two transitions, or to restore the state to the initial state using adiabatic passage that is caused by application of light with two wavelengths. Accordingly, in both cases, the repetition frequency is reduced by a degree corresponding to the time required to restore the state to the initial state. In addition, in the latter case, it is necessary to apply light of two wavelengths and control the intensity of the light. Also in this case, light of the same frequency as that of the resonator mode is applied, which inevitably causes the same problem as in the case of using the two-state system.

There is also a method in which a three-state system is contained in a resonator that has a mode resonating with a transition between |2>–|1>, and has a dissipation constant greater than the coupling constant of the mode and transition between |2>–|1>, and the transition between |2>–|1> is accelerated by the coupling of the mode and transition between |2>–|1> to quickly restore the initial state (see, for example, Japanese Patent No. 3682266). In this method, the time required for the restoration process can be reduced, but it is necessary to employ anther resonator. Further, it is desirable that no restoration process be needed between different energy states.

Furthermore, a method of generating a single photon in a microwave area has been recently developed, in which the transition frequency of a physical system considered as a two-state system in a superconductive state, called Cooper pairs box, is changed to cross a resonator mode to eject a microwave photon in the resonator mode (see, for example, American Physical Society March Meeting 2007, Publication No. H33-5).

Yet further, there is a method in which a two-state system is excited using adiabatic passage caused by laser beam application, and is used as a single-photon source. In this method, however, photons are ejected in various modes (directions), and no method of ejecting photons in a particular mode is disclosed.

A simple method of ejecting a single photon is not known, which differs from the conventional methods requiring a lot of time, or being complex and requiring a restoration process wherein stray light may be intensified, and which can realize a repetition frequency of approx. g/π, and in which excitation light differs in frequency (wavelength) from a resonator mode, i.e., a photon ejected.

BRIEF SUMMARY OF THE INVENTION

In accordance with an aspect of the invention, there is provided a method of generating a single photon, comprising: preparing an optical resonator having a resonator mode of a resonance angular frequency $\omega_c$; preparing a material contained in the optical resonator, having a low energy state |g> and a high energy state |e>, and having a transition angular frequency $\omega_a$ between |g>–|e> that is varied by an external field; applying, to the material, light of an angular frequency $\omega_l$ different from the resonance angular frequency $\omega_c$; and applying a first external field to the material to vary the transition angular frequency $\omega_a$ to resonate with the angular frequency $\omega_l$, such that the material is shifted to the high energy state |e>, and then applying a second external field to the material to vary the transition angular frequency $\omega_a$ to resonate with the resonance angular frequency $\omega_c$, such that the material is restored to the low energy state |g>.

In accordance with an aspect of the invention, there is provided a method of reading a quantum bit, comprising: preparing an optical resonator including a resonator mode of a resonance angular frequency $\omega_c$; preparing a material contained in the optical resonator, including a low energy state |g>, a high energy state |e>, and two states |0> and |1>, and including a transition angular frequency $\omega_a$ between |g>–|e> that is varied by an external field; generating a first pulse beam and a second pulse beam that resonate a transition between |g>–|e> and a transition between |1>–|e>, respectively; controlling the first pulse beam and the second pulse beam to temporally overlap each other to shift a first state in which a first intensity of the first pulse beam is higher than a second intensity of the second pulse beam, to a second state in which the second intensity is higher than the first intensity, to generate a third pulse beam; applying the third pulse beam to the material; and applying a first external field to the material after applying the third pulse beam thereto, to vary the transition angular frequency $\omega_a$ to resonate with the angular frequency $\omega_l$, then applying a second external field to the material to vary the transition angular frequency $\omega_a$ to resonate with the resonance angular frequency $\omega_c$, and reading a quantum bit depending upon whether a photon ejected from the optical resonator is detected.

BRIEF DESCRIPTION OF THE SEVERAL VIEWS OF THE DRAWING

FIG. 10 is a block diagram illustrating a quantum bit reading apparatus according to a fifth example.

DETAILED DESCRIPTION OF THE INVENTION

Referring to the accompanying drawings, a single-photon generation apparatus and a quantum bit reading apparatus according to an embodiment of the invention, and methods employed in the apparatuses will be described in detail. In the embodiment and examples thereof, like reference numbers denote like elements, and duplication of explanation will be avoided.

The single-photon generation apparatus and quantum bit reading apparatus according to the embodiment, and the methods employed in the apparatuses do not require a process of restoring a single physical system to the initial state after a photon is ejected, and can generate a photon of a frequency (wavelength) different from that of excitation light.

The mechanism of generating a single photon, employed in the embodiment, will be described briefly before describing the single-photon generation apparatus and quantum bit reading apparatus according to the embodiment, and the methods employed in the apparatuses.

In the embodiment, excitation light of a constant intensity and angular frequency ($\omega_l$), and an optical resonator having a resonance angular frequency ($\omega_c$) corresponding to a resonator mode frequency different from the angular frequency of the excitation light are prepared, and the excitation light is applied to a two-state system positioned to spatially overlap the spatial mode of the resonator. An external field (e.g., an electric field or magnetic field) can be applied to the two-state system to change the transition angular frequency ($\omega_a$) of the two-state system. Utilizing only changes in $\omega_a$, a photon can be ejected from the two-state system in the resonator mode, with the result that it is not necessary to employ a process of restoring the single physical system to its initial state after photon ejection, and a photon of an angular frequency (wavelength) different from that of the excitation light can be generated.

Figure 1:
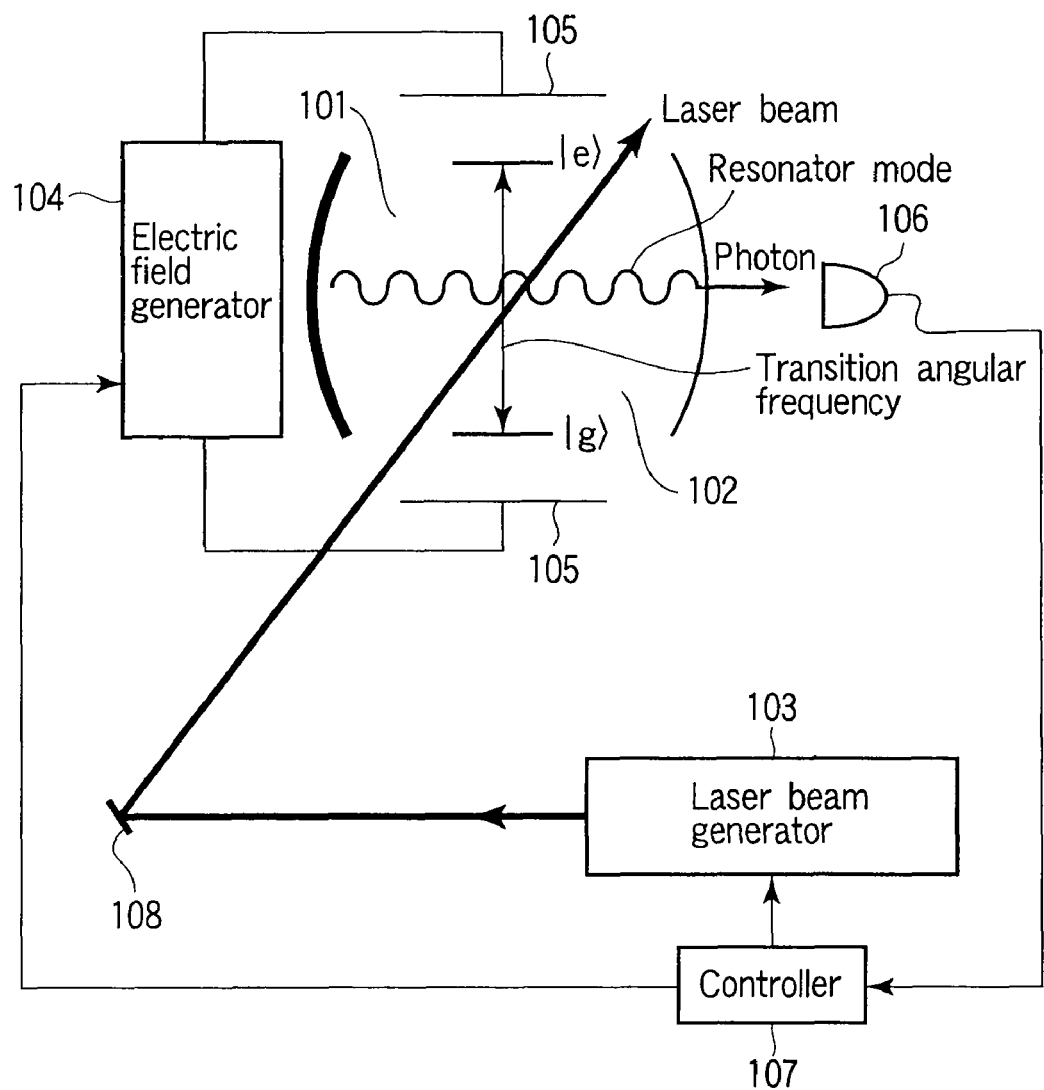
FIG. 1 is a block diagram illustrating a single-photon generation apparatus according to an embodiment.

Referring now to FIG. 1, a single-photon generation apparatus according to the embodiment will now be described.

The single-photon generation apparatus of the embodiment comprises an optical resonator 101, material 102, laser beam generator 103, electric field generator 104, electrodes 105, photodetector 106, controller 107 and mirror 108.

The optical resonator 101 has a resonator mode of an angular frequency $\omega_c$, and contains the material 102. The optical resonator 101 is a one-sided resonator including a one-side mirror having a reflectance of substantially 100%, and the opposite-side mirror having a reflectance of approx. 99.9%. The optical resonator 101 is, for example, a Fabry-Perot type one-sided resonator.

The material 102 includes a material as a two-state system having a transition angular frequency $\omega_a$. The transition angular frequency $\omega_a$ can be changed in accordance with the electric field generated by the electric field generator 104.

The laser beam generator 103 generates a laser beam of photons with an angular frequency $\omega_l$. $\omega_l$ and $\omega_c$ are set at different values. The laser beam is applied to the material 102 via the mirror 108. However, the mirror 108 is not indispensable, but the laser beam may be directly applied to the material 102.

The electric field generator 104 is connected to the two electrodes 105 and applies a voltage therebetween, thereby generating an electric field. The electric field is applied to the material 102 contained in the optical resonator 101.

The photodetector 106 detects a photon generated by the optical resonator 101.

The controller 107 controls the laser beam generator 103 to cause it to generate a laser beam or to stop generation of the laser beam. The controller 107 receives information indicating whether the photodetector 106 has detected a photon. The controller 107 controls the electric field generator 104 to control the intensity of the electric field applied to the optical resonator 101 so as to change the transition angular frequency ($\omega_a$) of the two-state system to a preset value. Change of the transition angular frequency ($\omega_a$) of the two-state system by the controller 107 will be described later with reference to FIG. 2.

Although in the case of FIG. 1, the transition angular frequency ($\omega_a$) is changed by applying an electric field to the material 102, it can be changed by applying another external field, such as a magnetic field, to the material 102. Application of a magnetic field to the material 102 will be described later with reference to FIG. 5. In the description below, if the same result is obtained even when "an electric field" is changed to "a magnetic field," these fields will be collectively referred to as "external fields."

Figure 2:
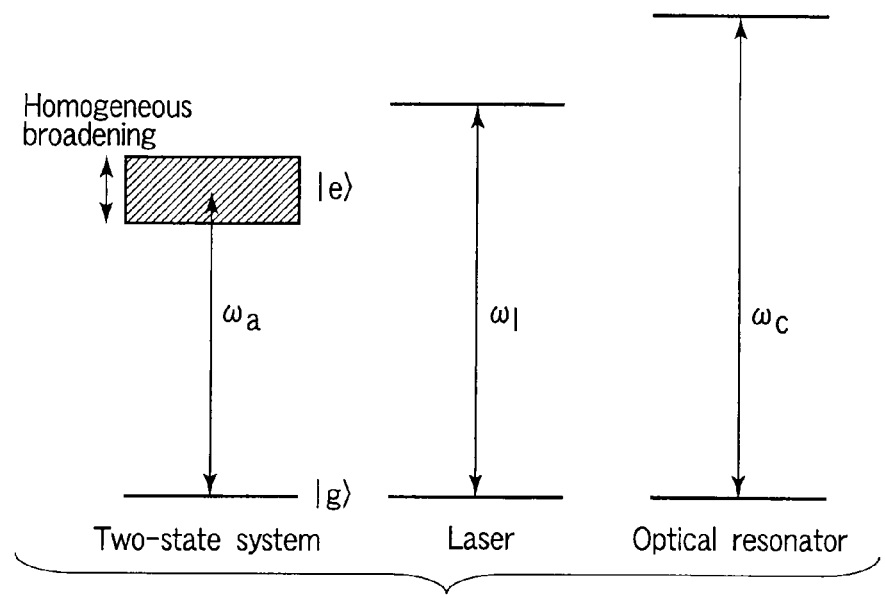
FIG. 2 is a view illustrating the relationship between the transition angular frequency of a two-state system, the photon angular frequency of a laser, and the angular frequency of the mode of an optical resonator.
Figure 3:
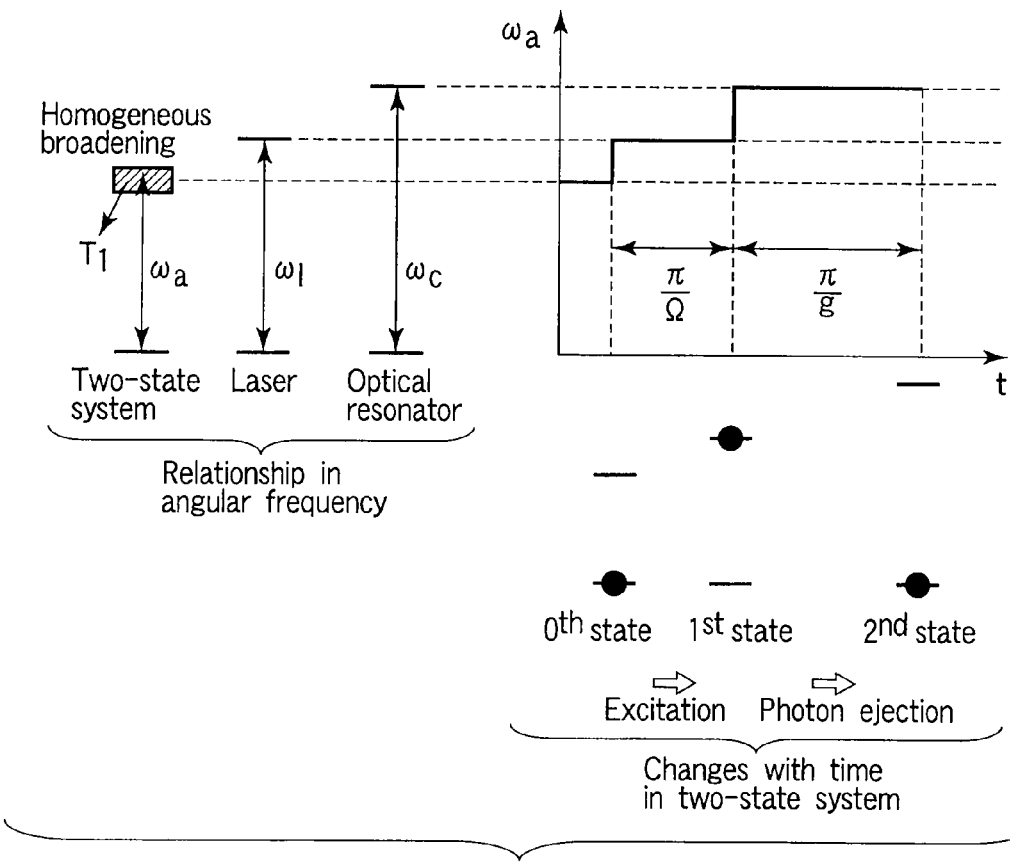
FIG. 3 is a view illustrating changes with time in two-state system, and useful in explaining generation of a photon by $\pi$ pulse irradiation.

Referring then to FIGS. 2 and 3, a mechanism and method of generating a photon will be described in detail.

FIG. 2 shows the relationship between the transition angular frequency ($\omega_a$) of the two-state system, the photon angular frequency ($\omega_l$) of the laser, and the resonance angular frequency ($\omega_c$) corresponding to the resonator mode of the optical resonator. $\omega_l$ and $\omega_c$ are set at different values, and $\omega_a$ can be varied by applying an external field.

Referring then to FIG. 3, a description will be given. Suppose that initially, the two-state system is in a lower energy state |g> where the two-state system does not resonate with excitation light (the $0^{th}$ state in FIG. 3). The transition angular frequency $\omega_a$ may be set to any initial value, if the two-state system does not resonate with the excitation light. Further, suppose that the dissipation constant ($\kappa$) of the optical resonator containing the two-state system is greater than the coupling constant (g) of the two-state system and the resonator mode ($\kappa$>g). In this state, the following two-stage operations are successively performed on the two-state system.

First Stage: An external field is applied to the two-state system to make the transition angular frequency $\omega_a$ equal to the angular frequency $\omega_l$ of the excitation light, and then the variation of the external field is stopped for a period of $\pi/\Omega$. This corresponds to application of a $\pi$ pulse to the two-state system. Accordingly, the two-state system is excited to a high energy state |e> (the $1^{st}$ state in FIG. 3).

Second Stage: The external field applied to the two-state system is changed to make the transition angular frequency $\omega_a$ equal to the resonance angular frequency $\omega_c$ corresponding to the resonator mode, and then the variation of the external field is stopped for a period of $\pi/g$. Since $\pi/g$ is half the cycle of vacuum Rabi oscillation caused by the coupling of the resonator mode and two-state system, the two-state system is changed from |e> to |g>, thereby ejecting a photon in the resonator mode. The photon ejected in the resonator mode is promptly ejected to the outside of the resonator in a period of approx. $1/\kappa$ (the $2^{nd}$ state of FIG. 3).

In the first stage, the two-state system is excited, and in the second stage, a photon is ejected from the two-state system in the resonator mode and the two-state system is deexcited.

By repeating the combination of the two operations (first-stage and second-stage operations), a single photon can be generated at regular intervals of $\pi/\Omega+\pi/g$. Since $\Omega=2\pi E\cdot\mu/h$ (E: electric field of the excitation light; $\mu$: Transition dipole moment; h: Plank's constant), if a strong excitation light is used, the cycle of generation of a single photon can be set to a value close to $\pi/g$. Namely, the highest repetition frequency that can be acquired when utilizing the resonator mode is realized, as in the conventional single-photon source using a two-state system described in the section "Background of the Invention."

In the above method, after the $2^{nd}$ repetition of the combination of the two operations performed in the first and second stages, the two-state system is restored to its original state, including the value of $\omega_a$, when the second stage is finished. Namely, the method does not require any particular restoration process as needed in the conventional case of using a three-state system, described in the section "Background of the Invention." Further, since $\omega_l$ and $\omega_c$ differ from each other, the excitation light differs from the ejected photon in angular frequency. Accordingly, the angular frequency (wavelength) of strong excitation light does not serve as stray light (noise) that interferes with a single photon.

In the method and mechanism described with reference to FIG. 3, Rabi oscillation caused by the coupling of the excitation light and two-state system is utilized in the first stage, and vacuum Rabi oscillation caused by the coupling of the resonator mode and two-state system is utilized in the second stage. In the first and second stages, adiabatic passage caused by the interaction of the two-state system and the excitation light or resonator mode can also be utilized.

Figure 4:
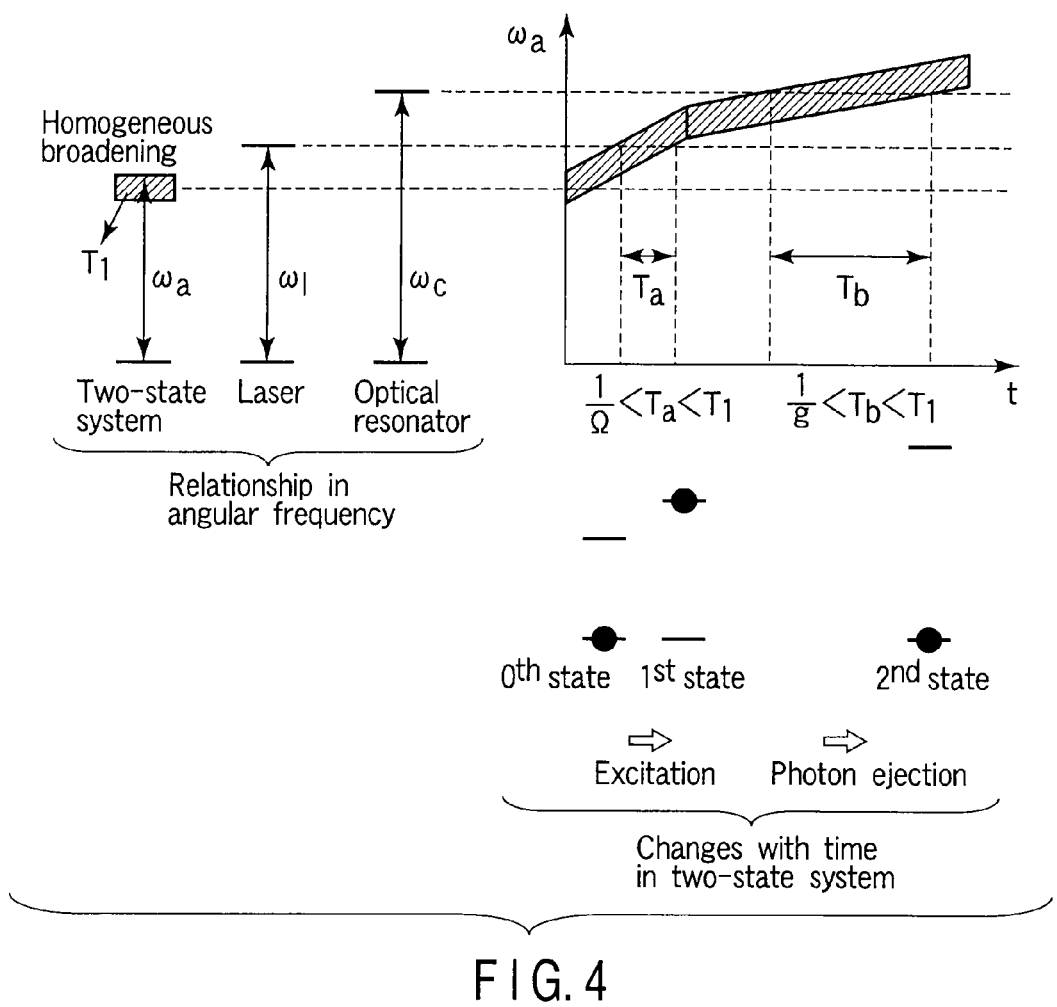
FIG. 4 is a view illustrating changes with time in two-state system, and useful in explaining generation of a photon using adiabatic passage.

Referring now to FIG. 4, a description will be given of a method using adiabatic passage.

When adiabatic passage is used in the first stage, the lifetime (the longitudinal relaxation time of the transition between |g>–|e>) of the high energy state |e> of the two-state system is set to $T_1$. If the spectrum width (angular frequency) of the excitation light is smaller than $1/T_1$, the transition angular frequency $\omega_a$ of the two-state system, which has the spectrum width of $1/T_1$, is continuously varied by varying an external field applied, to thereby cross the angular frequency $\omega_l$ of the excitation light in a period longer than $1/\Omega$ and shorter than $T_1$. As a result, the two-state system is excited from |g> to |e> by adiabatic passage due to the interaction of the two-state system and a single light beam (the first state of FIG. 4). More specifically, the state of the material is shifted to |e> by varying $\omega_a$ to cross the angular frequency domain defined by $\omega_l-\Delta/2$ and $\omega_l+\Delta/2$ in the period longer than $1/\Omega$ and shorter than $T_1$ ($\Delta$ is a homogeneous broadening).

When adiabatic passage is used in the second stage, the transition angular frequency $\omega_a$ of the two-state system in the state |e> is continuously varied by varying an external field applied, to thereby cross the resonance angular frequency $\omega_c$ corresponding to the resonator mode in a period longer than $1/g$ and shorter than $T_1$. As a result, a single photon is ejected from the two-state system in the resonator mode by adiabatic passage due to the interaction of the two-state system and the resonator mode, thereby shifting the two-state system from |e> to |g> (the second state of FIG. 4). More specifically, the state of the material is restored to |g> by varying $\omega_a$ to cross the angular frequency domain defined by $\omega_c-\Delta/2$ and $\omega_c+\Delta/2$ in the period longer than $1/g$ and shorter than $T_1$.

In the case of using adiabatic passage in both the first and second stages, $\omega_a(1)$, $\omega_a(2)$, $\omega_a(3)$ and $\omega_a(4)$ may have any value in accordance with $\omega_l$ and $\omega_c$, where $\omega_a(1)$, $\omega_a(2)$, $\omega_a(3)$ and $\omega_a(4)$ are the value assumed when the use of adiabatic passage is started in the first stage, the value assumed when the use of adiabatic passage is finished in the first stage, the value assumed when the use of adiabatic passage is started in the second stage, and the value assumed when the use of adiabatic passage is finished in the second stage, respectively. However, when $\omega_a$ crosses $\omega_l$ or $\omega_c$ during shifting from $\omega_a(2)$ to $\omega_a(3)$, or when $\omega_a$ crosses $\omega_l$ during shifting from $\omega_a(4)$ to $\omega_a(1)$, it is made to cross $\omega_l$ in a period sufficiently shorter than $1/\Omega$, and it is made to cross $\omega_c$ in a period sufficiently shorter than $1/g$, thereby maintaining the state (|g> or |e>) of the two-state system.

Also in the case of using Rabi oscillation in the first stage, and adiabatic passage in the second stage, when $\omega_a$ crosses $\omega_l$ or $\omega_c$ during shifting from the first stage to the second stage, or when $\omega_a$ crosses $\omega_l$ during shifting from the second stage to the first stage, it is made to cross $\omega_l$ in a period sufficiently shorter than $1/\Omega$, and it is made to cross $\omega_c$ in a period sufficiently shorter than $1/g$, thereby maintaining the state (|g> or |e>) of the two-state system.

Similarly, in the case of using adiabatic passage in the first stage, and vacuum Rabi oscillation in the second stage, when $\omega_a$ crosses $\omega_l$ or $\omega_c$ during shifting from the first stage to the second stage, or when it crosses $\omega_l$ during shifting from the second stage to the first stage, it is made to cross $\omega_l$ in a period sufficiently shorter than $1/\Omega$, and it is made to cross $\omega_c$ in a period sufficiently shorter than $1/g$, thereby maintaining the state (|g> or |e>) of the two-state system.

As described above, a single photon of a frequency different from that of excitation light can be generated at regular intervals of approx. $\pi/g$ or $1/g$ in any one of the four cases where i) Rabi oscillation is used in the first stage and vacuum Rabi oscillation is used in the second stage, ii) Rabi oscillation is used in the first stage and adiabatic passage is used in the second stage, iii) adiabatic passage is used in the first stage and vacuum Rabi oscillation is used in the second stage, and iv) adiabatic passage is used in both the first and second stages.

Figure 5:
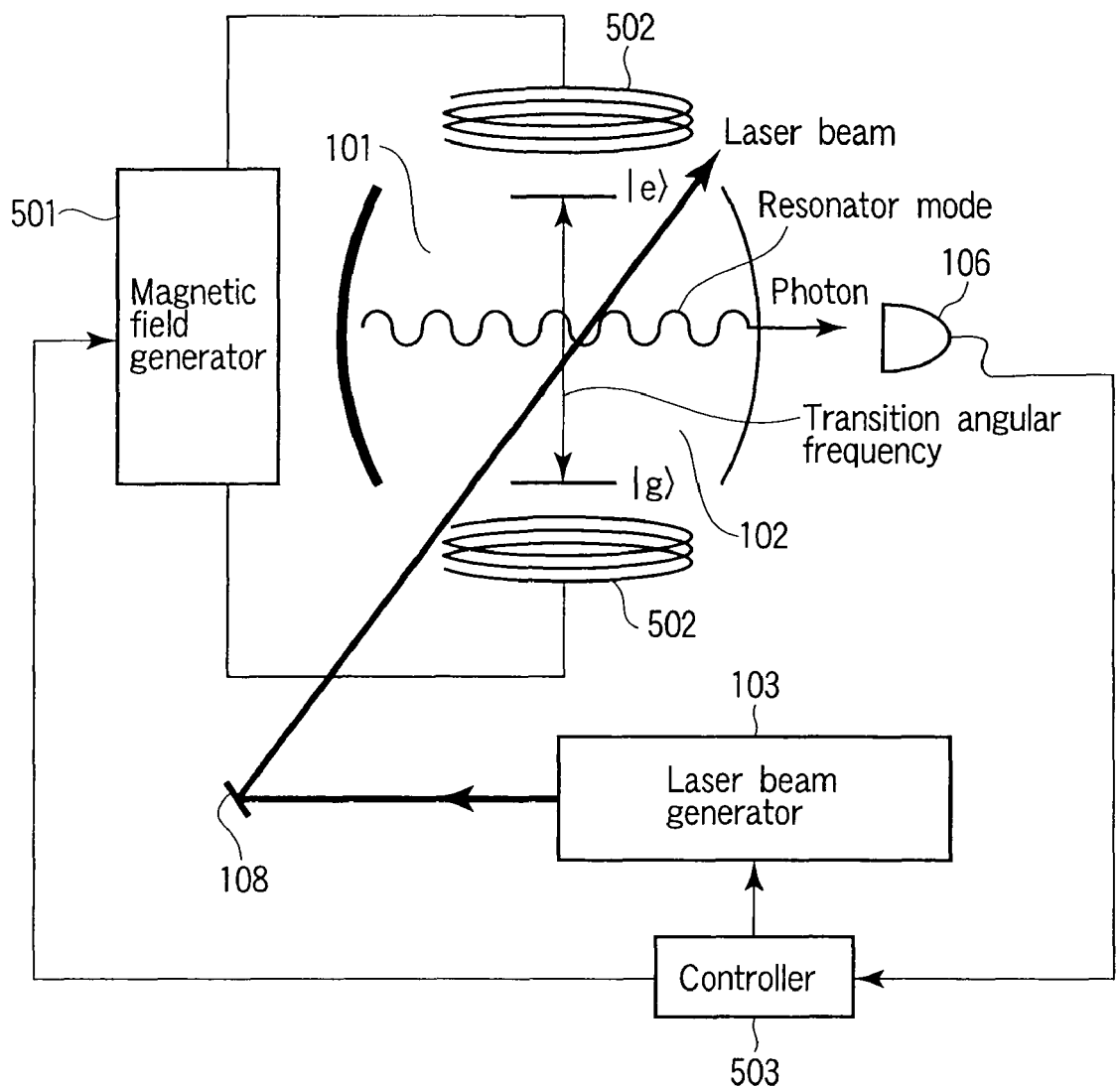
FIG. 5 is a block diagram useful in explaining a case where a magnetic field is used as an external field by the single-photon generation apparatus of the embodiment.

Referring then to FIG. 5, a description will be given of the case of using a magnetic field as the external field for the single-photon generation apparatus of the embodiment.

When a magnetic field is used as the external field, the single-photon generation apparatus of the embodiment comprises an optical resonator 101, material 102, laser beam generator 103, magnetic field generator 501, two coils 502, photodetector 106, controller 503 and mirror 108.

The magnetic field generator 501 causes a current to flow through the two coils 502 to thereby generate a magnetic field of a particular direction. The magnetic field is applied to the material 102 in the optical resonator 101.

The controller 503 controls the magnetic field generator 501 to adjust the intensity of the current flowing through the coils 502 to thereby adjust the strength of the magnetic field. By controlling the strength of the magnetic field applied to the interior of the optical resonator 101, the controller 503 changes the transition angular frequency ($\omega_a$) of the two-state system to a preset value. The controller 503 controls the laser beam generator 103 to make it generate a laser beam or to stop the generation of the laser beam. This is similar to a function of the controller 107. Further, the controller 503 receives information indicating whether the photodetector 106 has detected a photon. This is also to another function of the controller 107.

Figure 6:
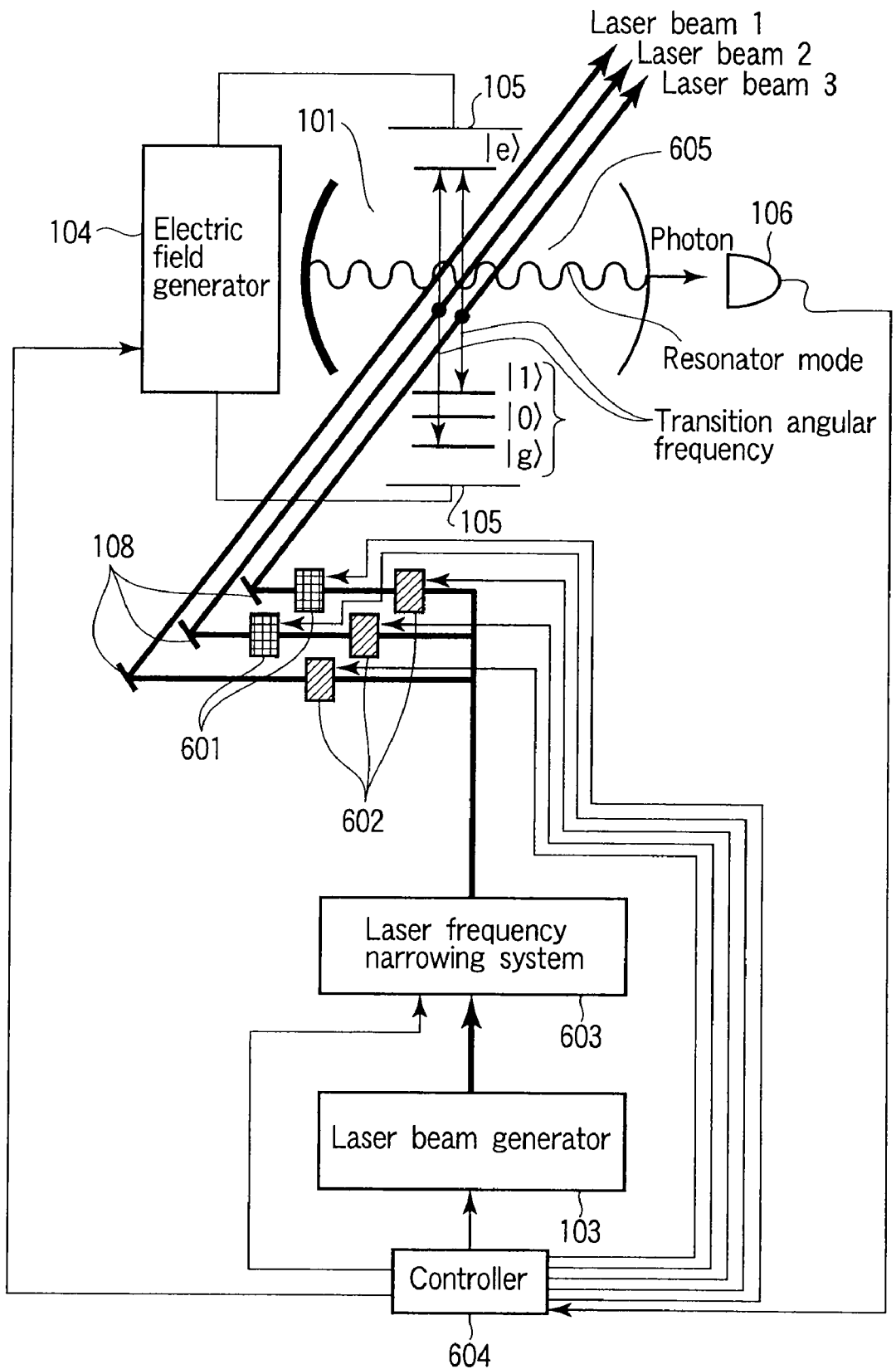
FIG. 6 is a block diagram illustrating a quantum bit reading apparatus according to the embodiment.

Referring to FIG. 6, a description will be given of the case of reading a quantum bit from the material 102.

As shown in FIG. 6, a quantum bit reading apparatus according to the embodiment comprises an optical resonator 101, laser beam generator 103, electric field generator 104, electrodes 105, photodetector 106, mirrors 108, intensity-modulating acousto-optic effect elements 601, frequency-setting acousto-optic effect elements 602, laser frequency narrowing system 603, controller 604 and material 605.

The material 605 can assume two more states ($|0\rangle$, $|1\rangle$), in addition to the states (i.e., the low energy state $|g\rangle$ and high energy state $|e\rangle$) of the above-described two-state system. Quantum bits are expressed using the two states $|0\rangle$ and $|1\rangle$.

The intensity-modulating acousto-optic effect elements 601 set intensifies for input light, and output light beams of the set intensities. The frequency-setting acousto-optic effect elements 602 set frequencies for input light, and output light beams of the set frequencies. The laser frequency narrowing system 603 narrows input light and outputs narrowed light.

The laser beam output from the laser frequency narrowing system 603 is divided into three laser beams using a beam splitter and mirror (which are not shown). The frequency-setting acousto-optic effect elements 602 receive the respective laser beams, set frequencies for the respective beams, and output laser beams of the set frequencies. The intensity-modulating acousto-optic effect elements 601 receive two laser beams included in the three laser beams, i.e., a laser beam 2 that resonates with a transition between $|g\rangle-|e\rangle$, and a laser beam 3 that resonates with a transition between $|1\rangle-|e\rangle$, and set intensities for the received laser beams.

The controller 604 controls the intensity-modulating acousto-optic effect elements 601 to make the laser beams 2 and 3 temporary overlap each other so as to shift a state in which the intensity of the laser beam 2 is higher than that of the laser beam 3, to a state in which the intensity of the laser beam 3 is higher than that of the laser beam 2. As a result of this control, the probability amplitude of the state $|1\rangle$ can be changed to that of the state $|g\rangle$, using adiabatic passage. If the material 605 is in the state $|1\rangle$, it is maintained in the state $|0\rangle$. After that, the controller 604 causes the electric field generator 104 to change the electric field so as to make the transition angular frequency $\omega_a$ equal to the angular frequency $\omega_l$ of excitation light (first operation). As a result of this control, the material 605 is excited from $|g\rangle$ to $|e\rangle$, if its initial state is $|1\rangle$ and is already shifted to $|g\rangle$ by adiabatic passage. Further, if the initial state of the material 605 is $|0\rangle$, it is maintained at $|0\rangle$. Thereafter, the controller 604 causes the electric field generator 104 to change the electric field so as to make the transition angular frequency $\omega_a$ equal to the angular frequency $\omega_c$ of the excitation light (second operation). As a result of this control, the material 605 emits a single photon in the resonator mode and the photon is ejected from the optical resonator 101 to its outside, if the initial state of the material 605 is $|e\rangle$. Further, if the initial state of the material 605 is $|0\rangle$, it is maintained at $|0\rangle$.

If the initial state of the material 605 is $|0\rangle$, and is maintained at $|0\rangle$ even after adiabatic passage due to the control of the controller 604, no photons are emitted from the material 605 and hence no photons are ejected to the outside of the optical resonator 101 even if the controller 604 causes the electric field generator 104 to change the electric field so as to make the transition angular frequency $\omega_a$ of the optical resonator equal to the angular frequency $\omega_c$ of the excitation light.

As described above, the first and second operations are alternately performed under the control of the controller 604. In this state, if the initial state of the material 605 is $|1\rangle$, a photon is ejected from the optical resonator 101 whenever the second operation is performed. In contrast, if the initial state of the material 605 is $|0\rangle$, no photons are ejected from the optical resonator 101. In other words, if the photodetector 106 detects a single photon under the control of the controller 604, it is known that the initial state of the material 605 is $|1\rangle$, whereas if the photodetector 106 does not detect any photon, it is known that the initial state of the material 605 is $|0\rangle$. Namely, the apparatus of FIG. 6 can perform quantum bit reading. Moreover, if the initial state of the material 605 is $|1\rangle$, repeatedly ejected photons can be observed. Accordingly, sufficiently accurate quantum reading can be realized even if a detector having a single-photon detection probability less than 100% is employed.

Figure 7:
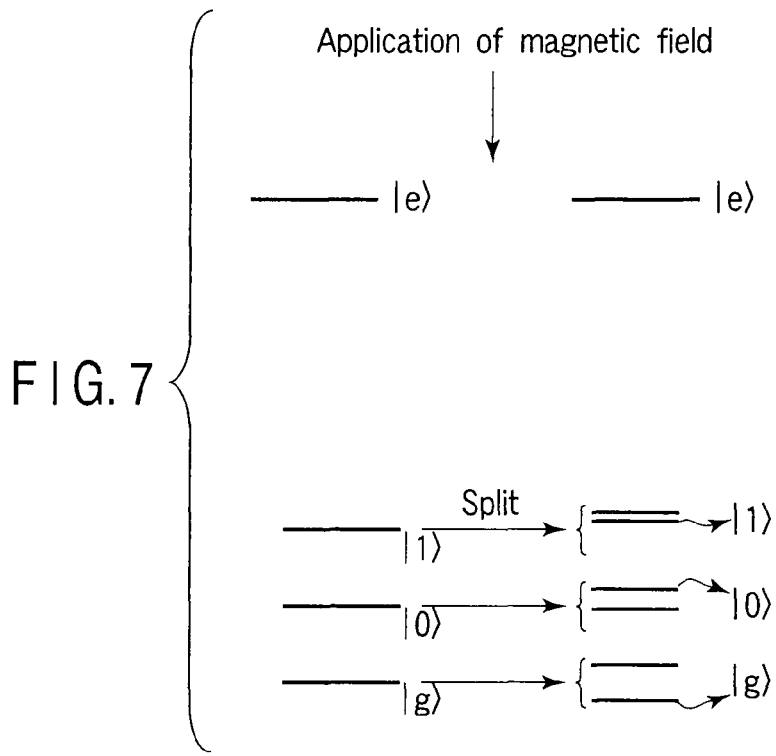
FIG. 7 is a view useful in explaining a case where a magnetic field is used as an external field by the quantum bit reading apparatus of FIG. 6.

Referring to FIG. 7, a description will be given of the case where a magnetic field is used as the external field in the quantum bit reading apparatus of FIG. 6.

When a magnetic field is used as the external field, the electric generator 104 and electrodes 105 shown in FIG. 6 are replaced with the magnetic field generator 501 and coils 502. In this case, the transition angular frequency ($\omega_a$) of a two-state system can be changed to a preset value by controlling the intensity of the magnetic field applied to the interior of the optical resonator 101, as in the case of FIG. 5.

When a magnetic field is applied to the material 605, each of the degenerated states $|g\rangle$, $|0\rangle$ and $|1\rangle$ is split into a plurality of states. At this time, one of the split states that correspond to each of the states $|g\rangle$, $|0\rangle$ and $|1\rangle$ is selected as shown in FIG. 7. Namely, the levels of the states $|g\rangle$, $|0\rangle$ and $|1\rangle$ are newly determined based on the split states.

After that, the same operations as those described with reference to FIG. 6 are performed except that the controller controls the magnetic field generator 501 to change $\omega_a$ by controlling the intensity of a magnetic field applied to the interior of the optical resonator 101. As a result, quantum bits can be read using the magnetic field as the external field.

Figure 8:
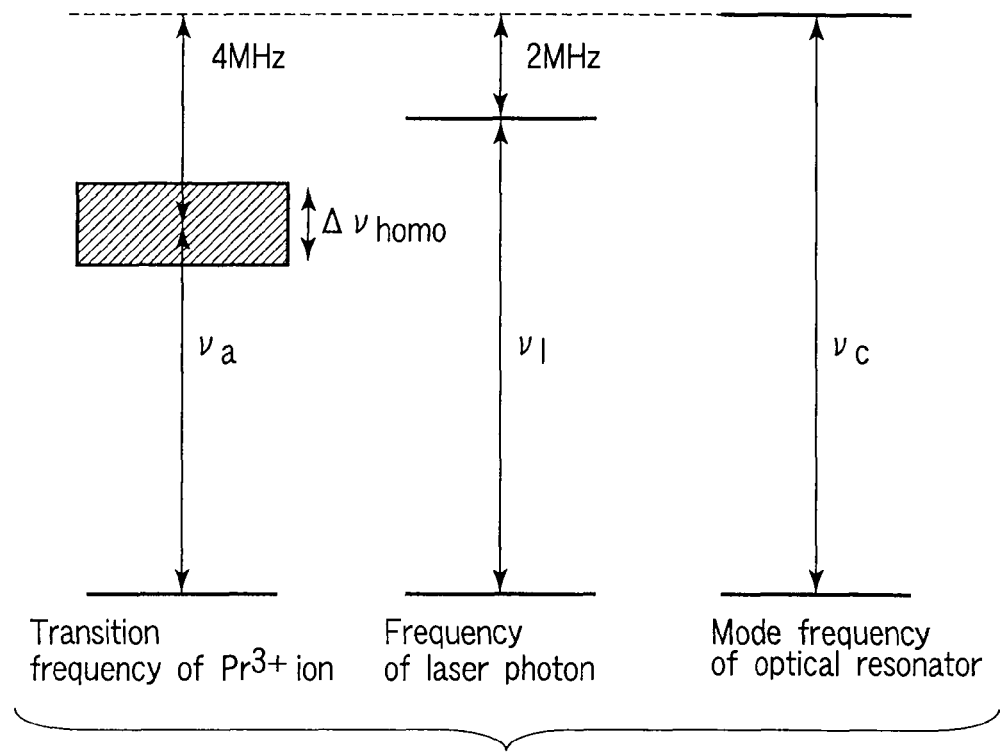
FIG. 8 is a view illustrating the relationship between the transition frequency of a $Pr^{+3}$ ion in $Y_2SiO_5$ crystal, the laser photon frequency, and the mode frequency of the optical resonator.
Figure 9:
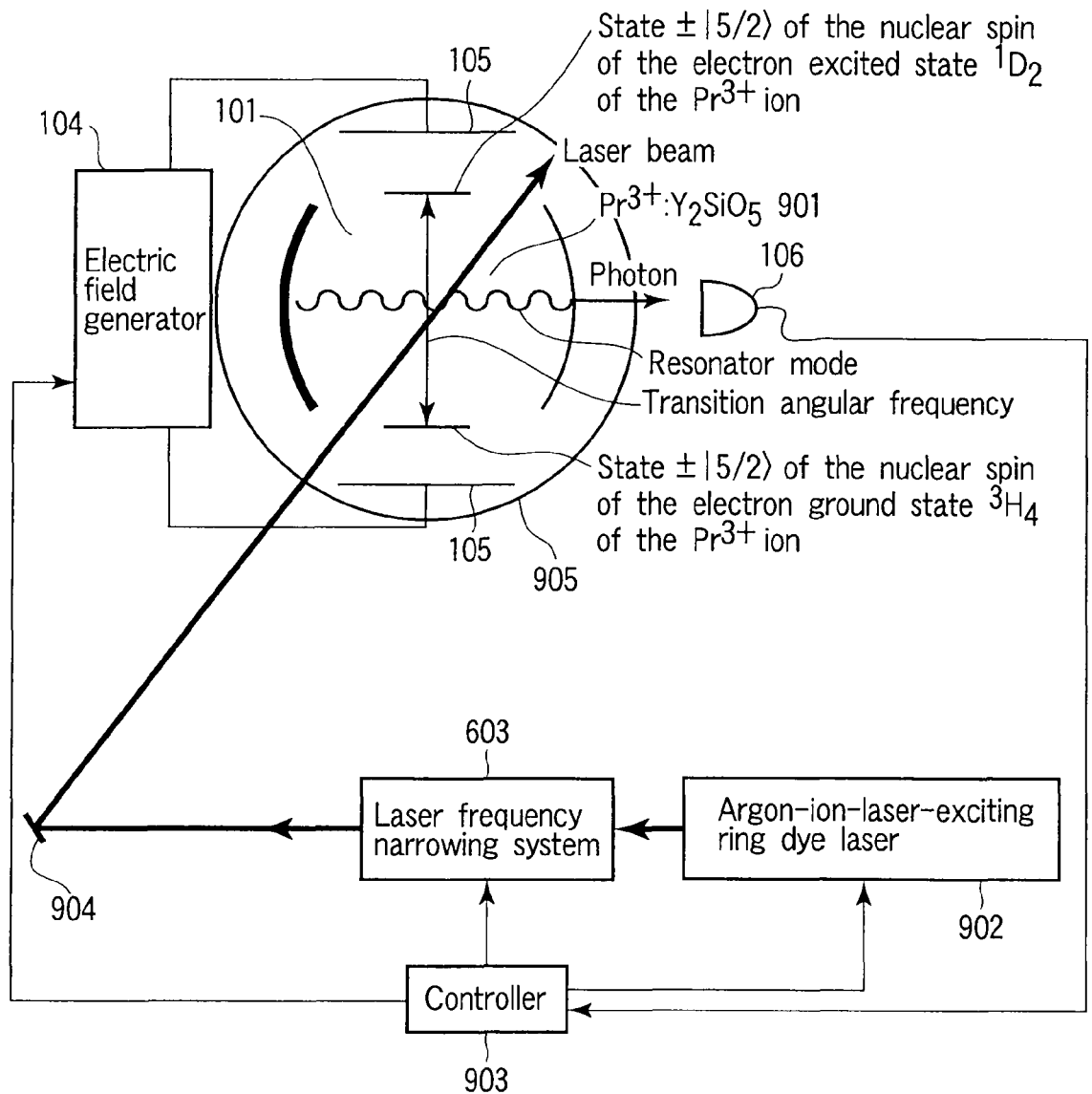
FIG. 9 is a block diagram illustrating a single-photon generation apparatus according to first to fourth examples.

Referring now to FIGS. 8 to 10, examples will be described.

FIRST EXAMPLE

FIG. 9 shows a single-photon generation apparatus according to first to fourth examples. In the first example, Rabi oscillation is used in the first stage, and vacuum Rabi oscillation is used in the second stage.

In the single-photon generation apparatus of the first example and a method employed therein, a $Pr^{3+}$ ion contained in $Pr^{3+}$:$Y_2SiO_5$ crystal obtained by replacing $10^{-5}$% $Y^{3+}$ ions in $Y_2SiO_5$ crystal with $Pr^{3+}$ ions is used as a two-state system. The $Pr^{3+}$:$Y_2SiO_5$ crystal corresponds to the material 102. This crystal has a size of approx. 2 mm×2 mm×2 mm, and extra-high reflectance mirrors are formed on the opposite surfaces of the crystal to have a resonator structure. One of the mirrors is set to a reflectance of substantially 100% (99.998% or more), and the other mirror is set to a reflectance of 99.924%, thereby providing a one-sided resonator (corresponding to the optical resonator 101). The resonator mode of this resonator is made to resonate with a frequency higher by approx. 4 MHz than a frequency $v_a$ (approx. 494.7 THz) corresponding to the f-f transition (hereinafter referred to simply as "optical transition of a $Pr^{3+}$ ion") of a 4f electron between the state ±|5/2> of the nuclear spin of the electron ground state $^3H_4$ of the $Pr^{3+}$ ion, and the state ±|5/2> of the nuclear spin of the electron excited state $^1D_2$ of the $Pr^{3+}$ ion. Further, the mode waist radius is set to approx. 1 μm, and the dissipation constant (κ) (energy dissipation constant) is set to approx. 5 MHz (frequency)). Crystal 901 is placed in a cryostat 905 and maintained at 1.5K.

As the crystal 901 containing the $Pr^{3+}$ ion, crystal in which only a single $Pr^{3+}$ ion existing near a mode waist in a space of a target single resonator mode is selected and used by observing vacuum Rabi split caused by the light input and coupled with the resonator mode.

Further, the spectrum of a ring dye laser 902 excited by an argon ion laser beam is narrowed to 1 kHz by a feedback laser frequency narrowing system 603 formed of a reference resonator, acousto-optic effect element and Electro-optic effect element, thereby stabilizing its absolute frequency. A controller 903 sets the frequency of the frequency narrowed laser to a value $v_l = v_c - 2$ lower by 2 MHz than the resonator mode frequency $v_c$, and applies it to the $Pr^{3+}$ ion in the crystal 901.

The electrodes 105 of an electric field generator 104 are connected to the crystal 901 to apply an electric field to the crystal 901. By applying an electric field by the controller 903, the transition angular frequency $v_a$ can be made to resonate with $v_l$ or $v_c$.

A photodetector 106 is provided near the lower-reflectance mirror of the optical resonator 101 as a one-sided resonator, to detect a photon ejected in the resonator mode to the outside of the resonator.

In this example, the coupling constant $g/(2\pi)$ of the resonator mode and the optical transition of the $Pr^{3+}$ ion is approx. 100 kHz, and the Rabi frequency $\Omega/(2\pi)$ caused by the coupling of the laser and the optical transition of the $Pr^{3+}$ ion is approx. 500 kHz, and the lifetime T of the electron excited state $^1D_2$ of the $Pr^{3+}$ ion is approx. 200 μs.

In the first example and subsequent examples, assuming that the homogeneous broadening (half-width) of the optical transition of the $Pr^{3+}$ ion at 1.5K is $\Delta v_{homo}$, as shown in FIG. 8, the electric field where $v_a = v_l - \Delta v_{homo}$ is set as E(1), the electric field where $v_a = v_l$ is set as E(2), the electric field where $v_a = v_l + \Delta v_{homo}$ is set as E(3), the electric field where $v_a = v_c - \Delta v_{homo}$ is set as E(4), the electric field where $v_a = v_c$ is set as E(5), and the electric field where $v_a = v_c + \Delta v_{homo}$ is set as E(6). FIG. 8 shows the relationship between $v_a$, $v_l$ and $v_c$.

In the first example, firstly, the electric field E(2) is applied, for 1 μs corresponding to π/Ω, to the crystal containing the $Pr^{3+}$ ion, to which any electric field is not yet applied. Subsequently, the electric field E(5) is applied to the crystal for 5 μs corresponding to π/g. After that, the application of the electric field E(2) for 1 μs and that of the electric field E(5) for 5 μs are alternately repeated, with the result that a photon is ejected to the low-reflectance mirror side of the one-sided resonator at intervals of 6 μs corresponding to π/Ω+π/g. This operation can be observed by the photodetector 106.

SECOND EXAMPLE

In a second example, adiabatic passage is used in both the first and second stages.

In the second example, when applying an electric field to crystal containing a $Pr^{3+}$ ion, the controller 903 firstly applies the electric field E(1) to the crystal, to which any electric field is not yet applied, then increases the electric field E(1) to the electric field E(3) at a preset increase rate in 10 μs, then increases the electric field E(3) to the electric field E(4), and then increases the electric field E(4) to the electric field E(6) at a preset increase rate in 40 μs. Thereafter, the controller 903 restores the state of the crystal to the initial state in which no electric field is applied, and then resumes the above-mentioned electric field application and increase. By repeating this process, a photon is ejected, every approx. 50 μs, to the low-reflectance mirror side of the optical resonator 101 as a one-sided resonator. This operation can be observed by the photodetector 106.

THIRD EXAMPLE

In a third example, Rabi oscillation is used in the first stage, and adiabatic passage is used in the second stage.

In the third example, when applying an electric field to crystal containing a $Pr^{3+}$ ion, the controller 903 firstly applies, for 1 μs corresponding to π/Ω, the electric field E(2) to the crystal, to which any electric field is not yet applied, then increases the electric field E(2) to the electric field E(4), and then increases the electric field E(4) to the electric field E(6) at a preset increase rate in 40 μs. Thereafter, the controller 903 restores the state of the crystal to the initial state in which no electric field is applied, and then resumes the above-mentioned increases in the magnitude of the electric field. By repeating this process, a photon is ejected, every approx. 40 μs, to the low-reflectance mirror side of the optical resonator 101 as a one-sided resonator.

This operation can be observed by the photodetector 106.

FOURTH EXAMPLE

In a fourth example, adiabatic passage is used in the first stage, and vacuum Rabi oscillation is used in the second stage.

In the fourth example, when applying an electric field to crystal containing a $Pr^{3+}$ ion, the controller 903 firstly applies the electric field E(1) to the crystal, to which any electric field is not yet applied, then increases the electric field E(1) to the electric field E(3) at a constant increase rate in 10 μs, then increases the electric field E(3) to the electric field E(5), and keeps the electric field E(3) for 5 μs corresponding to π/g. Thereafter, the controller 903 restores the state of the crystal to the initial state in which no electric field is applied, and then resumes the above-mentioned electric field application and increases. By repeating this process, a photon is ejected, every approx. 15 μs, to the low-reflectance mirror side of the optical resonator 101 as a one-sided resonator. This operation can be observed by the photodetector 106.

FIFTH EXAMPLE

FIG. 10 shows a single-photon generation apparatus according to a fifth example. In the fifth example, a description will be given of the case of reading a quantum bit from the crystal 901.

In this example, assume that states ±3/2>, ±1/2> and ±5/2> of the nuclear spin of the electron ground state $^3H_4$ of the $Pr^{3+}$ ion in the first example are set as the state of |0>, |1> and |g>, respectively. Further, the state ±|5/2> of the nuclear spin of the electron excited state $^1D_2$ of the $Pr^{3+}$ ion is set as |e>.

The laser beam emitted from a light source is split into three laser beams 1, 2 and 3 by a beam splitter, and the laser beam 1 is used as the laser beam employed in the first example. Except for applying the laser beams 2 and 3, the apparatus of the fifth example uses the same elements as those of the first example (the laser frequency narrowing system 603 and argon-ion-laser-beam exciting ring dye laser 902) to perform the same operation as the latter.

The acousto-optic effect elements 601 and 602 can perform frequency shift and intensity modulation of the laser beams 2 and 3. A controller 1001 controls the laser beams 2 and 3 to have frequencies that resonate with a transition between |g>–|e> and a transition between |1>–|e>, respectively, then shapes the laser beams 2 and 3 into Gaussian pulse beams of a half-width of 20 μs, and shifts the state of the crystal 901 containing the $Pr^{3+}$ ion from |1> to |g> using adiabatic passage caused by applying the laser beams 2 and 3 so that the laser beam 3 delays by 20 μs with respect to the laser beam 2.

Subsequently, the controller 1001 repeatedly applies an electric field for ejecting a photon to the crystal 901 containing the $Pr^{3+}$ ion and placed in the optical resonator 101 as in the first example, to which the laser beam 1 is applied. At this time, if the $Pr^{3+}$ ion is initially in the state |1>, it is shifted to the state |g>, and hence a photon is repeatedly generated. However, if the $Pr^{3+}$ ion is initially in the state |0>, it is kept at the state |0>, and hence no photons are generated. Thus, from whether the photodetector 106 repeatedly detects a photon, it can be detected which one of the states |0> and |1>, the $Pr^{3+}$ ion initially assumes. Namely, quantum bit reading can be performed.

In the above-described embodiment and examples, excitation light having a constant intensity and frequency, and a resonator mode set to a frequency different from that of the excitation light, are utilized, and an electric or magnetic field is applied to the interior of a resonator to vary the transition energy of a single two-state system contained in the resonator. With this simple structure, the single two-state system is excited to eject a photon in the resonator mode. As a result, a photon of a frequency (wavelength) different from that of excitation light is ejected from the two-state system without any process of restoring the state of the two-state system to its initial state after ejecting the photon.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of generating a single photon, comprising:
preparing an optical resonator including a resonator mode of a resonance angular frequency $\omega_c$;
preparing a material contained in the optical resonator, including a low energy state |g> and a high energy state |e>, and including a transition angular frequency $\omega_a$ between |g>–|e> that is varied by an external field;
applying, to the material, light of an angular frequency $\omega_l$ different from the resonance angular frequency $\omega_c$; and
applying a first external field to the material to vary the transition angular frequency $\omega_a$ to resonate with the angular frequency $\omega_l$, such that a state of the material is changed to the high energy state |e>, and then applying a second external field to the material to vary the transition angular frequency $\omega_a$ to resonate with the resonance angular frequency $\omega_c$, such that the state of the material is restored to the low energy state |g>.

2. The method according to claim 1, wherein the first external field is applied to make the transition angular frequency $\omega_a$ equal to the angular frequency $\omega_l$ for a period of $\pi/\Omega$ to change the state of the material to the high energy state |e>, and then the second external field is applied to make the transition angular frequency $\omega_a$ equal to the resonance angular frequency $\omega_c$ for a period of $\pi/g$ to restore the state of the material to the low energy state |g>, $\Omega$ being a Rabi angular frequency that indicates a magnitude of coupling of the light of the angular frequency $\omega_l$ and a two-state physical system, g being a coupling constant indicating a magnitude of coupling of the resonator mode and the two-state physical system.

3. The method according to claim 1, wherein the first external field is applied to vary the transition angular frequency $\omega_a$ to cross an angular frequency domain between $\omega_l-\Delta/2$ and $\omega_l+\Delta/2$ in a period longer than $1/\Omega$ and shorter than T to change the state of the material to the high energy state |e>, and then the second external field is applied to vary the transition angular frequency $\omega_a$ to cross an angular frequency domain between $\omega_c-\Delta/2$ and $\omega_c+\Delta/2$ in a period longer than $1/g$ and shorter than T to restore the state of the material to the low energy state |g>, $\Omega$ being a Rabi angular frequency that indicates a magnitude of coupling of the light of the angular frequency $\omega_l$ and a two-state physical system, g being a coupling constant indicating a magnitude of coupling of the resonator mode and the two-state physical system, T being a longitudinal relaxation time of a transition between |g>–|e>, $\Delta$ being a homogeneous broadening.

4. The method according to claim 1, wherein the first external field is applied to make the transition angular frequency $\omega_a$ equal to the angular frequency $\omega_l$ for a period of $\pi/\Omega$ to change the state of the material to the high energy state |e>, and then the second external field is applied to vary the transition angular frequency $\omega_a$ to cross an angular frequency domain between $\omega_c-\Delta/2$ and $\omega_c+\Delta/2$ in a period longer than $1/g$ and shorter than T to restore the material to the low energy state |g>, $\Omega$ being a Rabi angular frequency that indicates a magnitude of coupling of the light of the angular frequency $\omega_l$ and a two-state physical system, g being a coupling constant indicating a magnitude of coupling of the resonator mode and the two-state physical system, T being a longitudinal relaxation time of a transition between |g>–|e>, $\Delta$ being a homogeneous broadening.

5. The method according to claim 1, wherein the first external field is applied to vary the transition angular frequency $\omega_a$ to cross an angular frequency domain between $\omega_l-\Delta/2$ and $\omega_l+\Delta/2$ in a period longer than $1/\Omega$ and shorter than T to change the state of the material to the high energy state |e>, and then the second external field is applied to make the transition angular frequency $\omega_a$ equal to the resonance angular frequency $\omega_c$ for a period of $\pi/g$ to restore the material to the low energy state |g>, $\Omega$ being a Rabi angular frequency that indicates a magnitude of coupling of the light of the angular frequency $\omega_l$ and a two-state physical system, g being a coupling constant indicating a magnitude of coupling of the resonator mode and the two-state physical system, T being a longitudinal relaxation time of a transition between |g>–|e>, $\Delta$ being a homogeneous broadening.

6. The method according to claim 1, wherein the optical resonator is a one-sided Fabry-Perot resonator.

7. The method according to claim 1, wherein the material is a rare-earth ion contained in crystal, a transition between |g>–|e> corresponds to an f-f transition of the rare-earth ion, and the external field is an electric field or a magnetic field.

8. A method of reading a quantum bit, comprising:
preparing an optical resonator including a resonator mode of a resonance angular frequency $\omega_c$;
preparing a material contained in the optical resonator, including a low energy state |g>, a high energy state |e>, and two states |0> and |1>, and including a transition angular frequency $\omega_a$ between |g>–|e> that is varied by an external field;
generating a first pulse beam and a second pulse beam that resonate a transition between |g>–|e> and a transition between |1>–|e>, respectively;
controlling the first pulse beam and the second pulse beam to temporally overlap each other to shift a first state in which a first intensity of the first pulse beam is higher than a second intensity of the second pulse beam, to a second state in which the second intensity is higher than the first intensity, to generate a third pulse beam;
applying the third pulse beam to the material; and
applying a first external field to the material after applying the third pulse beam thereto, to vary the transition angular frequency $\omega_a$ to resonate with the angular frequency $\omega_l$, then applying a second external field to the material to vary the transition angular frequency $\omega_a$ to resonate with the resonance angular frequency $\omega_c$, and reading a quantum bit depending upon whether a photon ejected from the optical resonator is detected.

9. A single-photon generation apparatus comprising:
an optical resonator including a resonator mode of a resonance angular frequency $\omega_c$;
a material contained in the optical resonator, including a low energy state |g> and a high energy state |e>, and including a transition angular frequency $\omega_a$ between |g>–|e> that is varied by an external field;
a light source configured to apply, to the material, light of an angular frequency $\omega_l$ different from the resonance angular frequency $\omega_c$;
an external-field generation unit configured to apply external fields to the material to vary the transition angular frequency $\omega_a$ to resonate with one of the angular frequency $\omega_l$ and the resonance angular frequency $\omega_c$; and
a controller configured to control the light source to apply the light of the angular frequency $\omega_l$ to the material, and to control the external-field generation unit to make the transition angular frequency $\omega_a$ resonate with the resonance angular frequency $\omega_c$ to change a state of the material to the high energy state |e>, and then to control the external-field generation unit to make the transition angular frequency $\omega_a$ resonate with the resonance angular frequency $\omega_c$ to restore the state of the material to the low energy state |g>.

10. The apparatus according to claim 9, wherein the controller controls the external-field generation unit to make the transition angular frequency $\omega_a$ equal to the angular frequency $\omega_l$ for a period of $\pi/\Omega$ to change the state of the material to the high energy state |e>, and then controls the external-field generation unit to make the transition angular frequency $\omega_a$ equal to the resonance angular frequency $\omega_c$ for a period of $\pi/g$ to restore the material to the low energy state |g>, $\Omega$ being a Rabi angular frequency that indicates a magnitude of coupling of the light of the angular frequency $\omega_l$ and a two-state physical system, g being a coupling constant indicating a magnitude of coupling of the resonator mode and the two-state physical system.

11. The apparatus according to claim 9, wherein the controller controls the external-field generation unit to vary the transition angular frequency $\omega_a$ to cross an angular frequency domain between $\omega_l-\Delta/2$ and $\omega_l+\Delta/2$ in a period longer than $1/\Omega$ and shorter than T to change the state of the material to the high energy state |e>, and then controls the external-field generation unit to vary the transition angular frequency $\omega_a$ to cross an angular frequency domain between $\omega_c-\Delta/2$ and $\omega_c+\Delta/2$ in a period longer than $1/g$ and shorter than T to restore the state of the material to the low energy state |g>, $\Omega$ being a Rabi angular frequency that indicates a magnitude of coupling of the light of the angular frequency $\omega_l$ and a two-state physical system, g being a coupling constant indicating a magnitude of coupling of the resonator mode and the two-state physical system, T being a longitudinal relaxation time of a transition between |g>–|e>, $\Delta$ being a homogeneous broadening.

12. The apparatus according to claim 9, wherein the controller controls the external-field generation unit to make the transition angular frequency $\omega_a$ equal to the angular frequency $\omega_l$ for a period of $\pi/\Omega$ to change the material to the high energy state |e>, and then controls the external-field generation unit to vary the transition angular frequency $\omega_a$ to cross an angular frequency domain between $\omega_c-\Delta/2$ and $\omega_c+\Delta/2$ in a period longer than $1/g$ and shorter than T to restore the material to the low energy state |g>, $\Omega$ being a Rabi angular frequency that indicates a magnitude of coupling of the light of the angular frequency $\omega_l$ and a two-state physical system, g being a coupling constant indicating a magnitude of coupling of the resonator mode and the two-state physical system, T being a longitudinal relaxation time of a transition between |g>–|e>, $\Delta$ being a homogeneous broadening.

13. The apparatus according to claim 9, wherein the controller controls the external-field generation unit to vary the transition angular frequency $\omega_a$ to cross an angular frequency domain between $\omega_l-\Delta/2$ and $\omega_l-\Delta/2$ in a period longer than $1/\Omega$ and shorter than T to change the state of the material to the high energy state |e>, and then controls the external-field generation unit to make the transition angular frequency $\omega_a$ equal to the resonance angular frequency $\omega_c$ for a period of $\pi/g$ to restore the material to the low energy state |g>, $\Omega$ being a Rabi angular frequency that indicates a magnitude of coupling of the light of the angular frequency $\omega_l$ and a two-state physical system, g being a coupling constant indicating a magnitude of coupling of the resonator mode and the two-state physical system, T being a longitudinal relaxation time of a transition between |g>–|e>, $\Delta$ being a homogeneous broadening.

14. The apparatus according to claim 9, wherein the optical resonator is a one-sided Fabry-Perot resonator.

15. The apparatus according to claim 9, wherein the material is a rare-earth ion contained in crystal, a transition between |g>–|e> corresponds to an f-f transition of the rare-earth ion, and the external-field generation unit applies an external field, such as an electric field or a magnetic field, to the material.

16. A quantum-bit-reading apparatus, comprising:
the single-photon generation apparatus as claimed in claim 9, which employs a material including two states |0> and |1>, as well as the low energy state |g> and the high energy state |e>;
a generation unit configured to generate a first pulse beam and a second pulse beam that resonate a transition between |g>–|e> and a transition between |1>–|e>, respectively;
a controller configured to control the first pulse beam and second pulse beam to temporally overlap each other to shift a first state in which a first intensity of the first pulse beam is higher than a second intensity of the second pulse beam, to a second state in which the second intensity is higher than the first intensity, to generate a third pulse beam;
an applying unit configured to apply the third pulse beam to the material; and
a controller configured to control the external-field generation unit, after the applying unit applies the third pulse beam, to make the transition angular frequency $\omega_a$ resonate with the angular frequency $\omega_p$, then to control the external-field generation unit to make the transition angular frequency $\omega_a$ resonate with the resonance angular frequency $\omega_c$, and to read a quantum bit depending upon whether a photon ejected from the optical resonator is detected.

* * * * *